(12) United States Patent
Xue et al.

(10) Patent No.: US 12,496,393 B1
(45) Date of Patent: Dec. 16, 2025

(54) ULTRA-MINIATURIZED WIRELESS-CONTROLLED PATCH TYPE DRUG PUMP AND ITS PREPARATION METHOD

(71) Applicant: University of Electronic Science and Technology of China, Chengdu (CN)

(72) Inventors: Xinyu Xue, Chengdu (CN); Zhixian Jiang, Chengdu (CN); Lili Xing, Chengdu (CN); Rui Lin, Chengdu (CN); Ziyu Kuang, Chengdu (CN); Zhihe Long, Chengdu (CN)

(73) Assignee: University of Electronic Science and Technology of China, Chengdu (CN)

( * ) Notice: Subject to any disclaimer, the term of this patent is extended or adjusted under 35 U.S.C. 154(b) by 0 days.

(21) Appl. No.: 19/010,153

(22) Filed: Jan. 5, 2025

(30) Foreign Application Priority Data

Nov. 7, 2024 (CN) .......................... 202411583369.X

(51) Int. Cl.
*A61M 5/155* (2006.01)
*A61M 5/145* (2006.01)
*A61M 5/142* (2006.01)

(52) U.S. Cl.
CPC ........ *A61M 5/155* (2013.01); *A61M 5/14526* (2013.01); *A61M 2005/14204* (2013.01); *A61M 2205/0288* (2013.01); *A61M 2205/3592* (2013.01); *A61M 2205/3653* (2013.01); *A61M 2207/00* (2013.01)

(58) Field of Classification Search
CPC .............. A61M 5/155; A61M 5/14526; A61M 2005/14204; A61M 2205/0288; A61M 2205/3592; A61M 2205/3653; A61M 2207/00; A61M 5/14248; A61M 60/81; A61M 2005/3022

See application file for complete search history.

(56) References Cited

U.S. PATENT DOCUMENTS

| | | | |
|---|---|---|---|
| 5,505,704 A * | 4/1996 | Pawelka | A61M 5/31581 604/82 |
| 10,881,789 B2 * | 1/2021 | Damiano | A61M 5/1723 |
| 2012/0041427 A1 * | 2/2012 | Caffey | A61M 5/14526 604/151 |

* cited by examiner

*Primary Examiner* — Rachael E Bredefeld
*Assistant Examiner* — Fatimata Sahra Diop
(74) *Attorney, Agent, or Firm* — Central California IP Group, P.C.; Andrew D. Fortney

(57) ABSTRACT

An ultra-miniaturized wireless-controlled patch-type drug pump and a production method thereof, in the field of biomedical engineering device technology, are disclosed. The pump utilizes near-field communication (NFC) technology commonly found in smartphones to power the circuit. It injects drug into patients' bodies via volume alteration of a thermal expansion material and a gas generated by an electrolytic electrode, attaining pre-meal bolus and basal rate drug infusion. The drug pump has a relatively simple structure, a small size, and no need for an internal power supply, thereby alleviating at least some of the burden on patients and enhancing the comfort and convenience of wearing the pump. Meanwhile, it can be controlled through a smartphone application, simplifying the operation(s) of the pump and providing users with a precise and convenient drug injection approach.

4 Claims, 5 Drawing Sheets

ULTRA-MINIATURIZED WIRELESS-CONTROLLED PATCH TYPE DRUG PUMP AND ITS PREPARATION METHOD

RELATED APPLICATIONS

The present application claims priority to Chinese Pat. Appl. No. 202411583369.X, filed Nov. 7, 2024, the contents of which are incorporated by reference herein in their entirety.

TECHNICAL FIELD

The present invention belongs to the field of biomedical engineering device technology and specifically involves an ultra-miniaturized wireless-controlled patch-type drug pump and a method of preparing the pump.

BACKGROUND

Diabetes represents a significant global public health challenge, characterized by persistently high incidence rates and an increasing trend. There are two distinct forms of diabetes: type 1 and type 2. Type 1 diabetes is typically the result of autoimmune processes that lead to the destruction of pancreatic beta cells, thereby impairing insulin production. In contrast, type 2 diabetes primarily arises from decreased insulin sensitivity (insulin resistance) and/or inadequate insulin secretion.

Insulin therapy constitutes a fundamental component of the treatment regimen for individuals with diabetes, aiming to replicate the physiological insulin secretion pattern to maintain blood glucose levels as close to normal as possible. Patients with type 1 diabetes are dependent on exogenous insulin injections for glycemic control, while those with type 2 diabetes may require insulin therapy in conjunction with oral hypoglycemic agents. These patients typically need to administer multiple insulin injections daily, necessitating precise dosage allocation. Consequently, there is an urgent demand among diabetic patients for safe, accurate, and convenient methods of insulin administration that minimize the disruptions associated with their treatment.

Traditional daily insulin injection methods employ syringes or insulin pens for multiple subcutaneous injections, aiming to replicate the physiological secretion pattern of human insulin. Daily insulin therapy necessitates that patients self-administer injections several times a day, with common injection sites including the abdomen, thighs, buttocks, and upper arms. The absorption rate of insulin may vary across different injection sites. To prevent the development of subcutaneous fat hypertrophy or atrophy, it is essential to rotate injection sites. Depending on individual body composition and the chosen injection site, adjustments in needle depth and angle may be required. The types of insulin administered also differ. For example, long-acting or intermediate-acting insulin analogs function as basal insulins with extended action durations to provide continuous coverage and assist in controlling fasting and prandial blood glucose levels, while short-acting or rapid-acting analogs are utilized as mealtime insulin, and are typically injected before meals to manage postprandial blood glucose levels effectively. Furthermore, the dosage must be tailored according to blood glucose readings, dietary intake, exercise regimens, and other contextual factors in daily life. Traditional methods demand that patients possess strong self-management skills and discipline to ensure timely administration of insulin alongside regular monitoring of their blood glucose levels. Additionally, ongoing communication with healthcare professionals is crucial for optimizing treatment plans. Insulin pumps represent an advanced diabetes management tool capable of achieving more precise dose control compared to conventional injection techniques.

An insulin pump is an electronically controlled device designed to deliver insulin, featuring a basal rate and a bolus injection function for pre-meal administration. The basal rate represents a continuous, low-dose infusion of insulin set by the patient to mimic the secretion function of the human pancreas, thereby maintaining blood glucose levels during pre-meal periods and overnight. The bolus injection before meals involves a larger dose of insulin that the patient manually administers to mitigate postprandial hyperglycemia. Insulin pumps offer a treatment regimen that more closely resembles physiological insulin secretion patterns, facilitating more precise glycemic control and enhancing the overall quality of life. However, they necessitate certain learning and maintenance efforts. In contrast, traditional insulin injection methods are relatively straightforward and cost-effective, but exhibit reduced flexibility and precision in blood glucose management compared to their pump counterparts.

SUMMARY

The traditional daily insulin injection method remains the predominant treatment for diabetes. However, it presents several limitations that may adversely impact patients' glycemic control and overall quality of life. First, this method struggles to accurately replicate the physiological secretion pattern of human insulin, leading to suboptimal blood glucose regulation and increased fluctuations. Due to imprecise dosing and a lack of timely adjustments, patients are at an elevated risk of hypoglycemia, particularly before meals or following physical activity. Second, patients often require multiple daily injections of insulin, which can interfere with their daily routines and result in pain or discomfort at the injection sites. Prolonged use of insulin injections may also induce metabolic complications at these sites, such as lipoatrophy, thereby affecting both insulin absorption and glycemic control. Thirdly, the traditional injection approach is ill-equipped to accommodate sudden changes in patients' lifestyles, such as variations in meal timing or alterations in exercise levels, resulting in restricted social interactions and diminished quality of life due to stringent dietary planning requirements. Furthermore, frequent injections can impose psychological stress on patients. Lastly, conventional syringes or insulin pens lack the capability for fine-tuning basal rates and pre-meal bolus doses akin to an insulin pump. They also do not automatically adjust infusion rates based on real-time blood glucose measurements. Additionally, self-injection practices may lead to issues such as needle reuse or improper technique hygiene that heighten infection risks.

To address the aforementioned technical challenges, this invention introduces an ultra-miniaturized wireless-controlled patch-type insulin pump designed for insulin delivery in patients. However, the present pump may be useful for delivering other drugs or drug combinations, such as drugs that are useful for treating high blood pressure, other cardiovascular conditions, depression, anxiety, psychosis, etc. The present pump harnesses near-field communication (NFC) technology (e.g., from smartphones) to power its circuitry, and employs at least in part volumetric changes of a thermal expansion material to facilitate drug injection into the patient's body, as detailed below.

The present ultra-miniaturized wireless-controlled patch-type insulin pump comprises a drug reservoir lid (which may be circular), two complementary recessed reservoirs (each of which may be half-cylindrical), and a semi-implantable base.

A central line bisecting the drug reservoir lid features a groove that enables the lid (or cover) to fold along this line. The upper surface of the lid includes a control circuit and an NFC coil. This reservoir lid is divided into a first (e.g., semicircular) section and a second (e.g., semicircular) section along the central line, with a lower surface of the first section including a heating electrode, while a lower surface of the second section includes electrolytic electrodes. Additionally, magnetic hooks or posts (which may also be adhesive) are at the edges of the first and second sections (e.g., along their lower surfaces). The control circuit, NFC coil, heating electrode, and electrolytic electrode are electrically interconnected. Furthermore, the control circuit regulates operation(s) of the heating electrode and/or the electrolytic electrode.

The drug reservoirs have an upper edge that may include a magnetic slot or opening that correspond to the magnetic hooks or posts on the drug reservoir lid. The interface between the drug reservoirs may align with the central groove of the drug reservoir lid. Each drug reservoir has an aperture in its lowermost surface. Specifically, the drug reservoirs are a high-dose drug reservoir and a basal rate execution reservoir. The high-dose execution reservoir contains a thermally driven fluid pump (e.g., above the drug storage region). This thermally driven fluid pump comprises a heat-conducting thin film encapsulation layer (which may comprise aluminum or an aluminum alloy), a thermal expansion material (which may comprise expandable particles in a binder), and a high-dose propulsion piston. The heat-conducting thin film encapsulation layer contacts the heating electrode, transferring heat to the thermal expansion material, which subsequently actuates the propulsion piston. As a result, the drug is expelled through the aperture at the bottom of the drug reservoir. Similarly, the basal rate execution reservoir includes a pneumatic fluid pump (e.g., above its corresponding drug storage region). This pneumatic fluid pump comprises an electrolyte encapsulation layer (which may comprise polyethylene-coated paper), an electrolyte (which may comprise an aqueous salt solution or a dilute aqueous alkali solution), and a basal rate propulsion piston. The electrolytic electrodes penetrate through the electrolyte encapsulation layer and contact the electrolyte to facilitate electrolysis and generate a gas that puts pressure on the basal rate propulsion piston. Consequently, as in the, the drug is forced out from the aperture in the basal rate drug reservoir. The aperture(s) in the drug reservoirs may be sealed with aluminum foil.

The semi-implantable base comprises a base body, a contact base, and one or more infusion conduits. Both the base body and the contact base include through-holes or apertures that align with the apertures in the drug reservoirs. Each of the through-holes in the base corresponds to an infusion conduit. Collectively, the apertures in the drug reservoirs, the base body and the contact base establish a continuous infusion pathway.

The base body may further include upward protrusions surrounding the apertures or through-holes, and the drug reservoirs may further include a layer of aluminum foil over the apertures therein. Upon placement of the drug reservoir onto the base body, these through-holes penetrate the aluminum foil, thereby creating a passageway.

The detailed procedure for the operation of the heating electrode and electrolytic electrodes, as controlled and/or regulated by the control circuit, is generally as follows.

The NFC coil captures an NFC signal (e.g., from a smart terminal) and relays it to the NFC chip, which subsequently forwards information in the signal to the MCU for further processing. Additionally, the NFC chip may utilize an integrated energy harvesting circuit (e.g., a rectifier) to generate a voltage, thereby providing power for the entire control circuit. Alternatively, the energy harvesting circuit may be separate from the NFC chip.

The invention further includes a method for making the wireless patch-type pump, which may include the following steps.

3D printing a base body, first and second drug reservoirs and a cover for the first and second drug reservoirs. The cover features (i) a central groove between the first and second drug reservoirs and (i) a plurality of holes through the cover. Each of the first and second drug reservoirs includes an aperture in a lowermost surface thereof, and the base body contains first and second apertures that align with the apertures in the lowermost surface of each of the first and second drug reservoirs. The drug reservoirs may have a shape that is complementary to each other and that may be half-cylindrical. The cover may be circular. Each of the base body, drug reservoirs, and cover may comprise an epoxy resin and have one or more dimensions that match corresponding dimension(s) of the other structures. The method may further include forming a magnetic slot or opening along a peripheral edge of each drug reservoir, and securing or affixing a magnetic hook or post to an edge of the cover using an epoxy adhesive. The base body may further include upward extensions around the aperture therein, configured to fit into the aperture in each drug reservoir. The drug reservoirs may have an outer radius substantially equal to a radius of the cover, and each of the drug reservoirs may have a height that is 25-70% of the outer radius. For example, the cover may have a radius of 12±0.2 mm and a thickness of 2±0.1 mm, and the drug reservoirs may have an outer radius of 12=0.2 mm, an inner radius of 11.3±0.2 mm, and a height of 5.5=0.1 mm.

Adhering an infusion conduit to each of the first and second apertures in the base body, and encapsulating an outermost surface of the base body to create a contact interface. The infusion conduits may comprise a polyimide tube, and may be adhered to the apertures in the base body using an epoxy adhesive. The method may further comprise placing a stainless steel needle tip around one end of the polyimide tube to function as an infusion needle, and the contact interface may comprise poly(dimethyl siloxane) (PDMS).

Inserting a plunger into each of the drug reservoirs, and introducing a predetermined volume of a drug through the aperture in the lowermost surface of the drug reservoirs. The plungers may be semi-circular, and have area dimensions equal to those of the drug reservoirs. The plunger may be adjusted to ensure that a level of the drug is flush with the aperture, and the method may further seal the apertures with aluminum foil (e.g., after the drug is added and/or the plunger is adjusted). The amount of the drug in the first drug reservoir may be the same as or different from the amount of the drug in the second drug reservoir.

Incorporating expandable particles into a mixture of a binder and a curing agent, mixing thoroughly to form a particle-infused mixture, transferring the particle-infused mixture onto the plunger in the first drug reservoir, and sealing the first drug reservoir with aluminum foil to form a high-dose drug reservoir. The binder may be or comprise polydimethylsiloxane (PDMS).

Introducing an electrolyte onto the plunger in the second drug reservoir, and sealing the second drug reservoir with a barrier film to establish a basal rate execution reservoir.

Forming an NFC coil on the cover, depositing a thin film around the holes in the cover on both an outermost surface and an inner surface of the cover, and securing a heating electrode onto the inner surface of a first subset of the covers and electrolytic electrodes onto the inner surface of a second subset of the covers with an adhesive. The heating electrode and the electrolytic electrodes are in electrical contact with the thin film around the holes in the cover. The thin film and the NFC coil may be formed and/or deposited simultaneously, and/or by electron beam evaporation or printing. The adhesive may comprise an epoxy resin and/or an epoxy adhesive.

Securing a circuit board containing a control circuit onto the outermost surface of the cover, and connecting the circuit board to the heating electrode, electrolytic electrodes, and NFC coil through the thin film around the holes in the cover. The method may further comprise encapsulating the outermost surface of the cover with PDMS.

Securing the high-dose drug reservoir and the basal rate execution reservoir to the base body, and placing the cover the high-dose drug reservoir and the basal rate execution reservoir to complete the wireless patch-type drug pump. The method may further comprise inserting the magnetic hooks or posts in the magnetic slots or openings. The magnetic hooks or posts and the magnetic slots or openings are configured to form magnetic fasteners.

In comparison to the current state of technology, the present invention offers several distinct advantages.

Embodiments of the present invention have resulted in a highly miniaturized, detachable patch-type insulin pump designed for wireless control of insulin administration.

The present invention incorporates one or more (e.g., a plurality of) disposable drug (e.g., insulin) reservoirs, characterized by a straightforward structural design and low manufacturing costs, effectively alleviating a burden on patients. In contrast to conventional insulin pumps, the consumables associated with this invention are more easily replaceable, thereby reducing operational complexity and enhancing the overall patient experience. Furthermore, the drug capacity of the reservoir can be customized to meet the individual needs of different patients.

The present invention operates without an internal power supply, utilizing NFC technology for both energy provision and control, which significantly reduces the weight and dimensions of the pump, while also enhancing patient comfort during use. Through a dedicated smartphone application, users can effortlessly select between high-dose or basal-rate infusion administration and/or control via the mobile interface.

This invention adopts a simplified mechanical structure and/or design, reducing the quantity of internal components, and presents a simple and highly efficient circuit design. It utilizes a thermally-driven fluid pump and a pneumatic fluid pump for insulin injection, both of which may be powered or driven by heat expansion materials and/or generation of gas by electrolysis. The fluid pumps are assembled in the drug reservoir (e.g., for single use), offering outstanding reliability and durability, and providing stable treatment outcomes to users.

BRIEF DESCRIPTION OF THE DRAWINGS

FIG. 5A shows the variation of temperature and thermally driven fluid pump volume over time, and FIG. 5B shows the variation of pneumatic fluid pump volume over time.

DETAILED DESCRIPTION

To have a better understanding of the purpose(s), structures, and functions of the invention, a more detailed description of the ultra-miniaturized wireless-controlled patch-type insulin pump will be provided below, along with the accompanying figures.

This invention offers an ultra-miniaturized patch-type insulin pump for the wireless control of insulin injections. It is based on near-field communication technology and utilizes the NFC function of a smartphone or other near-field device to supply power to the circuit, thereby achieving wireless control of the insulin pump.

This invention uses and/or stores the energy conveyed by NFC technology in the circuit to supply power to the electrolytic electrode and other components in the pump. The electrolytic electrode electrolyzes water slowly to generate gas, which (in a closed drug reservoir) builds a pressure that propels a membrane in the drug reservoir to inject insulin gradually, attaining a basal rate injection. The heating electrode causes the volume of the thermal expansion material to increase relatively rapidly, driving the drug reservoir to inject insulin quickly and achieve a pre-meal and/or high-dose injection.

In a model test system, a pump exemplifying the invention infused insulin into agarose gel blocks in vitro in two different working modes, simulating the use of the patch-type pump on the human body. Wireless power is supplied via NFC functionality in a smartphone or other NFC device (e.g., a tablet computer, a wireless remote controller, etc.), and the pump does not need a power source or battery. The present patch-type drug infusion pump has thus accomplished short-term high-dose insulin infusion and sustained basal rate insulin infusion (e.g., in the model system).

Figure 1:
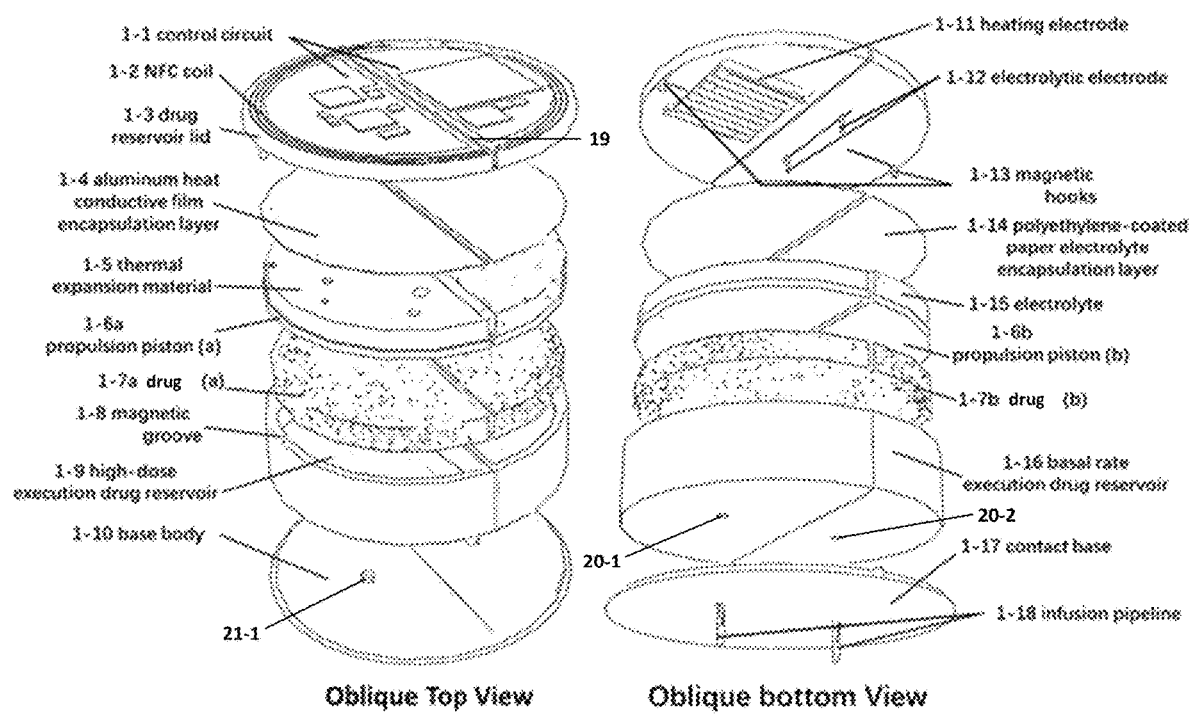
FIG. 1 represents a dual-perspective structural schematic of an embodiment of the invention. The specific reference marks are as follows: control circuit (1-1), NFC signal receiving NFC coil (1-2), drug reservoir lid (1-3), heat conductive film encapsulation layer (1-4), thermal expansion material (1-5), propulsion piston (1-6), drug storage medium (e.g., for insulin; 1-7), magnetic adhesive groove (1-8), high-dose execution drug reservoir (1-9), base body (1-10), heating electrode (1-11), electrolytic electrode (1-12), magnetic adhesive hooks (1-13), electrolyte encapsulation layer (1-14), electrolyte (1-15), basal rate execution drug reservoir (1-16), contact base (1-17), and infusion pipeline (1-18).
Figure 2:
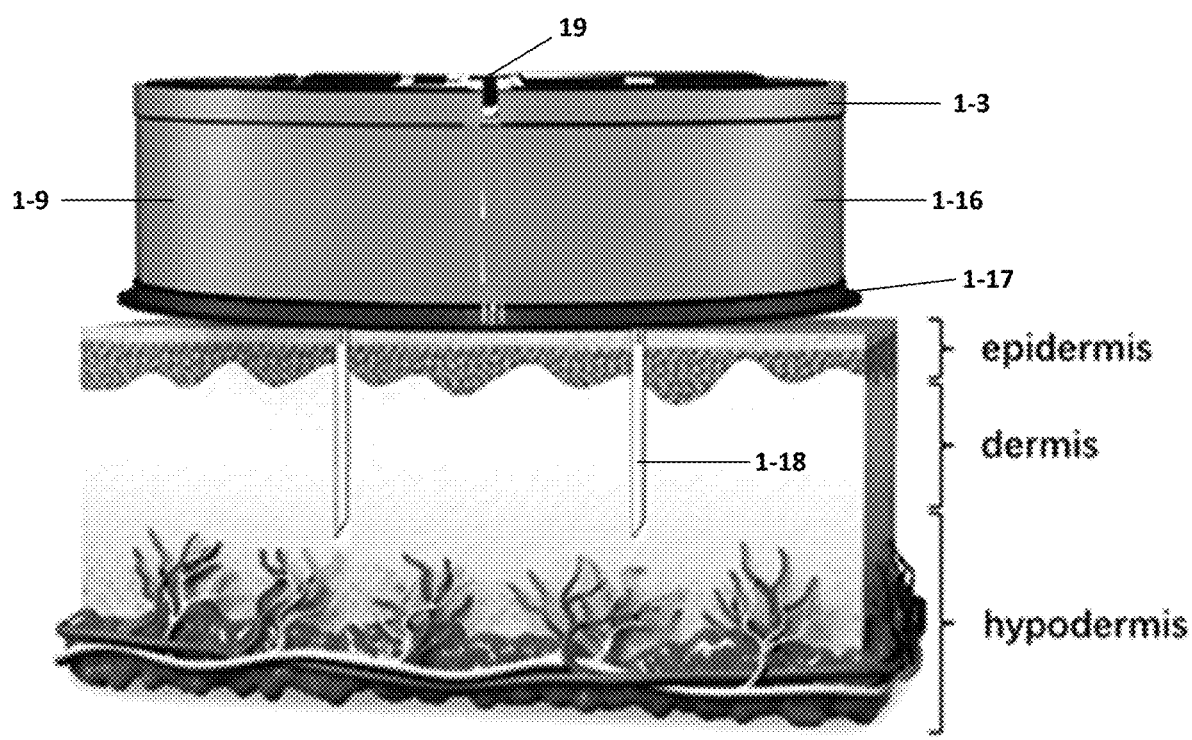
FIG. 2 is a schematic diagram illustrating an operation of the invention.

As shown in FIG. 2, an embodiment of the ultra-miniaturized wireless-controlled patch-type pump has a cylindrical or disk-like shape, although the device may have a different shape (e.g., square, rectangular, hexagonal, octagonal, irregular, etc.). The device may be adhered onto the skin surface (e.g., with an adhesive), with the infusion tubing (e.g., pipelines 1-18, FIG. 1) being inserted into subcutaneous tissue (e.g., the dermis). The infusion site is typically on the abdomen, buttocks, upper arm, or outer thigh. The device can be sectioned into a drug reservoir lid, two complementary half-cylindrical drug reservoirs (which may be concave, in order to fit other components therein and form a sealed compartment together with the corresponding reservoir lid), and a semi-implantable base. The patch pump can also be divided into a first half featuring a high-dose insulin pump, and a second half featuring a basal rate insulin pump. The two pumps can be operated independently, without interfering with each other.

Exploded perspective diagrams of the internal structures of the patch insulin pump are presented in FIG. 1. In these diagrams, a bisecting line or central axis of the drug reservoir lid (1-3) features a groove 19, enabling the cover to fold along the axis. The upper or outer surface of the drug reservoir lid includes a control circuit (1-1) and an NFC coil (1-2). The drug reservoir lid is divided into a first semicircular cover and a second semicircular cover along the groove 19. The lower or inner surface of the first semicircular cover includes the heating electrode (1-11), while the lower or inner surface of the second semicircular cover includes the electrolytic electrode (1-12). Each of the first and second semicircular covers may have one or more magnetic adhesive hooks (1-13) on the lower or inner surface, along a peripheral edge.

The control circuit 1-1, the NFC coil 1-2, the heating electrode 1-11, and the electrolytic electrode 1-12 are electrically connected (e.g., directly or indirectly to each other). Among them, the control circuit 1-1 comprises a high-dose circuit module (e.g., a high-dose pump control circuit) and a basal rate circuit module (e.g., a basal rate pump control circuit), respectively controlling the operation of the heating electrode and the electrolytic electrode.

Specifically, the NFC coil (1-2) receives an NFC signal emitted by an external control device (e.g., a smartphone) and conveys it to the control circuit (1-1), which governs (e.g., transmits control signals to) the high-dose circuit module and the basal rate circuit module. The high-dose circuit module is linked to the heating electrode, and the basal rate circuit module is connected to the electrolytic electrode. The heating electrode and the electrolytic electrode are mutually non-interfering.

The edge(s) of each half-cylindrical recessed drug reservoir 1-9 and 1-16 along its opening (e.g., the upper edge) may include one or more magnetic adhesive grooves 1-8, positioned to correspond to or align with a corresponding magnetic adhesive hook 1-13 on the drug reservoir lid 1-3 for firmly securing and/or sealing the reservoirs 1-9 and 1-16. A fitting portion of the two drug reservoirs 1-9 and 1-16 may precisely align with the central groove 19 on the drug reservoir lid 1-3. Holes 20-1 and 20-2 may be present at the bottom of the respective drug reservoirs 1-9 and 1-16. The two drug reservoirs 1-9 and 1-16 may be classified as a high-dose execution drug reservoir and a basal rate execution drug reservoir. The interior of the high-dose execution drug reservoir encompasses a thermal fluid pump and the drug (e.g., a solution of insulin), with the thermal fluid pump above the drug. The thermal fluid pump comprises a heat-conducting thin film encapsulation layer (1-4, which may comprise aluminum), a thermal expansion material (1-5), and a propulsion piston (1-6a). The heat-conducting thin film encapsulation layer 1-4 is in contact with the heating electrode 1-11, and heat is transferred to the thermal expansion material (1-5) from the heating electrode 1-11, subsequently pushing the high-dose propulsion piston (1-6a). The drug solution (in a carrier 1-7a, such as a sponge or other compressible material having a large number of spaces or vacancies therein) is squeezed by the piston 1-6a and flows out from the hole 20-1 in the bottom of the drug reservoir 1-9. The interior of the basal rate execution drug reservoir 1-16 contains a pneumatic fluid pump and the drug (e.g., insulin), with the pneumatic fluid pump located above the drug. The pneumatic fluid pump comprises an electrolyte encapsulation layer (1-14, which may comprise polyethylene-coated paper, a polyacrylate-coated paper, polyvinyl alcohol-coated paper or another waterproof, chemically-stable and environmentally-friendly encapsulation material), an electrolyte (1-15), and a basal rate propulsion piston (1-6b). Electrolytic electrodes 1-12 penetrate the electrolyte encapsulation layer (1-14) and enter the electrolyte (1-15, which may comprise water or an aqueous solution of a salt such as NaCl or an alkali such as NaOH in a sponge or other compressible material having a large number of spaces or vacancies therein) to electrolyze the electrolyte and generate gas, thereby pushing the basal rate propulsion piston (1-6b, which may comprise a water impermeable, relatively stiff material such as high-modulus polyethylene, high-density polyethylene, polypropylene, polyvinyl chloride, poly [acrylonitrile-butadiene-styrene], etc.). The solution of the drug (e.g., insulin) is squeezed by the piston and flows out from the hole 20-2 in the bottom of the drug reservoir 1-16. Prior to use, the bottom hole(s) 20-1 and/or 20-2 of the drug reservoir(s) 1-9 and/or 1-16 are sealed using aluminum foil.

The two drug reservoirs 1-9 and 1-16 may comprise complementary half-cylindrical depressions, with an outer radius of 12 mm, an inner radius of 11.3 mm, and a height of 5.5 mm, although other dimensions are also suitable and/or acceptable.

The semi-implantable base comprises the base body (1-10), the contact base (1-17), and one or more infusion conduits (1-18; e.g., at least one conduit 1-18 per drug reservoir). The base body 1-10 and the contact base 1-17 are equipped with two through holes (only one of which, 21-1, is shown), and the positions of these through holes correspond to the holes 20-1 and 20-2 at the bottom of the two drug reservoirs 1-9 and 1-16. The two through-holes on the base respectively correspond to two infusion conduits 1-18, and the through-holes 20-1 and 20-2 in the drug reservoirs 1-9 and 1-16, through-holes (not shown) in the base body 1-10 and the contact base 1-17, and the infusion conduits 1-18 jointly form an infusion pathway. The base 1-17 may have a maximum radius of 14 mm and a thickness of 2 mm, but the invention is not limited to such dimensions. The contact base 1-17 may also be soft or compressible, and may adhere to the skin. For example, the contact base 1-17 may comprise a silicone or organosilicone polymer.

Furthermore, the base body 1-10 may include short, hollow cylinders or other upward extensions that extend above the through-holes 21-1, and a layer of aluminum foil may cover the outlet of the medicine reservoirs 1-9 and 1-16 (and optionally, be adhered to the underside or outer surface of the drug reservoirs 1-9 and 1-16). When the medicine reservoirs 1-9 and 1-16 are placed onto the base, the cylinders puncture the aluminum foil to form a passage.

FIG. 2 is a schematic diagram of the embodiment of the ultra-miniaturized patch-type drug (e.g., insulin) pump in FIG. 1. As depicted, the device is adhered to the skin surface, with the infusion tubing 1-18 being inserted into the subcutaneous tissue. The infusion site is typically situated on the abdomen, buttocks, upper arm, or outer thigh. The device can include a drug reservoir lid 1-3, two complementary half-cylindrical drug reservoirs 1-9 and 1-16, and a semi-implantable base. The patch-type pump may be divided into a first half featuring a high-dose insulin pump, and a second half equipped with a basal rate insulin pump, which operate independently from (e.g., do not interfere with) each other.

The NFC coil, control circuit, heating electrode, and electrolyte electrode are integrated into a polylactic acid (PLA) drug reservoir lid 1-3, which may be made by 3D-printing. The two halves of the drug reservoir lid 1-3 can be independently folded along the central groove 19 to open one of the reservoirs 1-9 or 1-16, and affixed to the disposable and/or removable drug reservoirs 1-9 or 1-16 using a magnetic fastener (e.g., a magnetic snap, a magnetic hook or post 1-13 and groove 1-8 as shown in FIG. 1, etc.). The basal rate drug reservoir 1-16 and the high-dose drug reservoir 1-9 can be independently replaced, and each drug reservoir may comprise a half-cylindrical cup or tray with a radius of 11.3 mm, a depth of 2.5 mm, and/or a volume of 0.5 ml, although the invention is not limited to such dimensions. The drug reservoirs 1-9 and 1-16 may be fixed to the base 1-17 and connected to the infusion tube 1-18, and the outermost surface of the base 1-17 may be encapsulated in polydimethylsiloxane (PDMS) to ensure contact with the skin. The tip of each infusion tube 1-18 may comprise (e.g., is packaged in) sterile 316L stainless steel, and each infusion tube 1-18 may have a length of 4 mm to ensure that it can reach subcutaneous tissue and release the drug (e.g., insulin), thereby simulating a drug release mechanism in a normal human body.

The NFC coil on the outermost surface of the drug reservoir lid 1-3 receives an NFC signal (e.g., emitted by a smartphone running a suitable pump control application) and transmits it to the control circuit, which processes the signal. The NFC signal conveys information, and electrical energy can be harvested from it (e.g., using a rectifier). The NFC chip extracts information from the signal and transfers the information to the control circuit. control circuit may first determine from the signal whether the pump is to deliver a high-dose infusion or a basal rate infusion. Subsequently, the control circuit or rectifier may supply electrical power (e.g., collected by the NFC coil or harvested by the rectifier) to the corresponding circuit module (e.g., corresponding to the high-dose pump or the basal rate pump).

When the high-dose circuit module is in operation, it will promptly supply electrical power to the heating electrode. The heating electrode may generate Joule heat, and the temperature ascends rapidly within 15-20 seconds, inducing a rapid increase in the volume of the thermal expansion material. The thermally-driven fluid pump thereby injects the drug (e.g., insulin) into the body within 30 seconds by high-dose infusion from the high-dose drug reservoir 1-9.

When the basal rate circuit module is in operation, it temporarily stores electrical power (e.g., received from the control circuit or rectifier) in one or more capacitors (which may be integrated into the NFC chip and/or the basal rate circuit module), and gradually utilizes it to electrolyze the electrolyte (e.g., water in the electrolyte solution). The electrolytic electrodes may be inserted into the electrolyte medium, uniformly and gradually generating gas, thereby causing the basal rate infusion piston to actuate for a period of time of 30 minutes or more (e.g., 6-12 hours), thereby slowly and uniformly injecting the drug (e.g., insulin) into the body. The specific duration of a single basal rate infusion cycle can be adjusted by the user using a control program (e.g., in or on a smartphone terminal) according to their requirements.

After the NFC signal supplies power to the basal rate circuit module, the basal rate circuit commences and persists in operation for an extended period. As few as 2 power supplies (e.g., recharges using an NFC signal) per can fulfill the basal drug infusion demands throughout an entire day. A single NFC signal is sufficient to supply enough power to the high-dose circuit module for the patch-type pump to deliver a short-term pre-meal high-dose insulin injection within a brief period. The NFC coil and energy-harvesting circuitry is shared by the basal rate circuit module and the high-dose circuit module, both of which may be separately or independently in electrical communication with the NFC receiving end (e.g., the NFC coil and rectifier), and they are mutually independent and do not interfere with one another.

Figure 3:
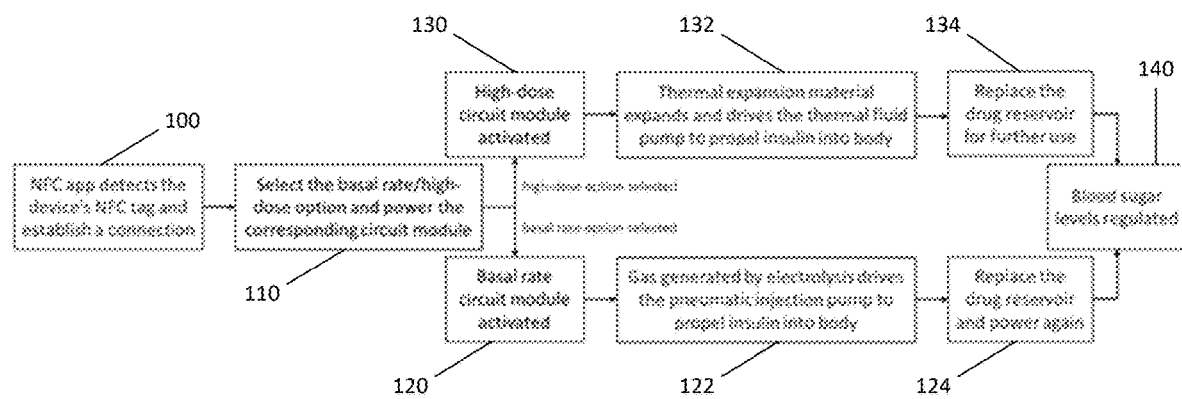
FIG. 3 is a flowchart depicting operation modes of the invention.

FIG. 3 is a flowchart depicting exemplary operations of the invention. During its application, the patch pump is affixed to the skin surface (preferably after sterilizing the skin surface), the needles of the infusion tubes are inserted into the subcutaneous tissue, and a fixing device may be secured. After applying the patch pump, an application on a smartphone or other NFC-enabled interface device can be opened, and the interface device brought near (e.g., within 1-5 cm) of the NFC tag on the top of the drug reservoir lid to establish a connection (e.g., communication between the interface device and the pump) at 100. In the application, the user selects either the basal rate option or the high-dose option at 110, then activates the signal transmission (by the NFC protocol) to power the corresponding circuit module. When the user selects the basal rate option, the basal rate circuit module is activated at 120 and begins operation. The electrolytic electrodes electrolyze the electrolyte solution (e.g., the water therein) gradually and uniformly, generating gas to drive the pneumatic injection pump, which propels insulin into the body at a basal rate. This operation can continue up to 12-24 hours with a single 1-minute NFC charge (e.g., storage of electrical power supply derived from the NFC signal), achieving the basal rate infusion of insulin. The basal rate reservoir may be designed to deplete the medicine precisely when the power is exhausted, and another basal rate injection can be made by replacing the reservoir and recharging the basal rate circuit module at 124. Selecting the basal rate option (e.g., including the electrolysis process) does not influence the operation of the high-dose circuit module.

When a high-dose injection (e.g., of insulin before a meal) is desired or required, the user may use the application on the interface device to select the high-dose option and establish a connection with the NFC tag on the drug reservoir lid at 130. In the application, the user's selection of the high-dose option enables and/or activates transmission of the NFC signal to power the high-dose circuit module, and the high-dose circuit supplies power to the heating electrode, which generates Joule heat. The heat is transferred through the thermally-conductive film layer to the thermal expansion material. The thermal expansion material expands rapidly, forcing the drug out of the reservoir and into the body at 132. In one embodiment, expansion of the thermal expansion material compresses the drug-containing medium in the high-dose reservoir substantially completely, to deliver a known dose of the drug (e.g., substantially all of the drug in the reservoir) to the user. Thus, the high-dose injection process may be promptly completed after each NFC signal transmission and/or power supply, and it does not interfere with the basal rate injection. Once the high-dose injection is concluded, the drug reservoir can be directly removed and replaced at 134, and in some embodiments, it can be substituted with a drug reservoir containing a different drug load (e.g., from 2 to 10 units of rapid-acting insulin) as necessary before the next high-dose demand. The two working modules (e.g., the high-dose and basal rate modules) do not interfere with each other and are jointly employed to regulate blood sugar levels at 140.

In one embodiment, the maximum drug capacity of the reservoir is 0.5 ml, which may be capable of holding 50 units of U-100 insulin. However, reservoirs capable of storing and delivering up to 100 doses of insulin (e.g., regular insulin, rapid-acting insulin, intermediate-acting insulin, long-acting insulin or ultra-long-acting insulin) or more are within the scope of the invention. The specific drug capacity can be customized by the individual needs of the user to accommodate various actual circumstances. Regardless of whether the drug capacity of the drug compartment is large or small, a large-dose injection will inject the entire amount of insulin into the drug compartment within a short period. Meanwhile, the basal rate injection will adjust the speed of the electrolytic solution based on the drug capacity input into the smartphone application, enabling the pneumatic fluid pump to evenly inject the insulin over a predetermined time period (e.g., 12 hours, 24 hours, etc.).

Figure 4:
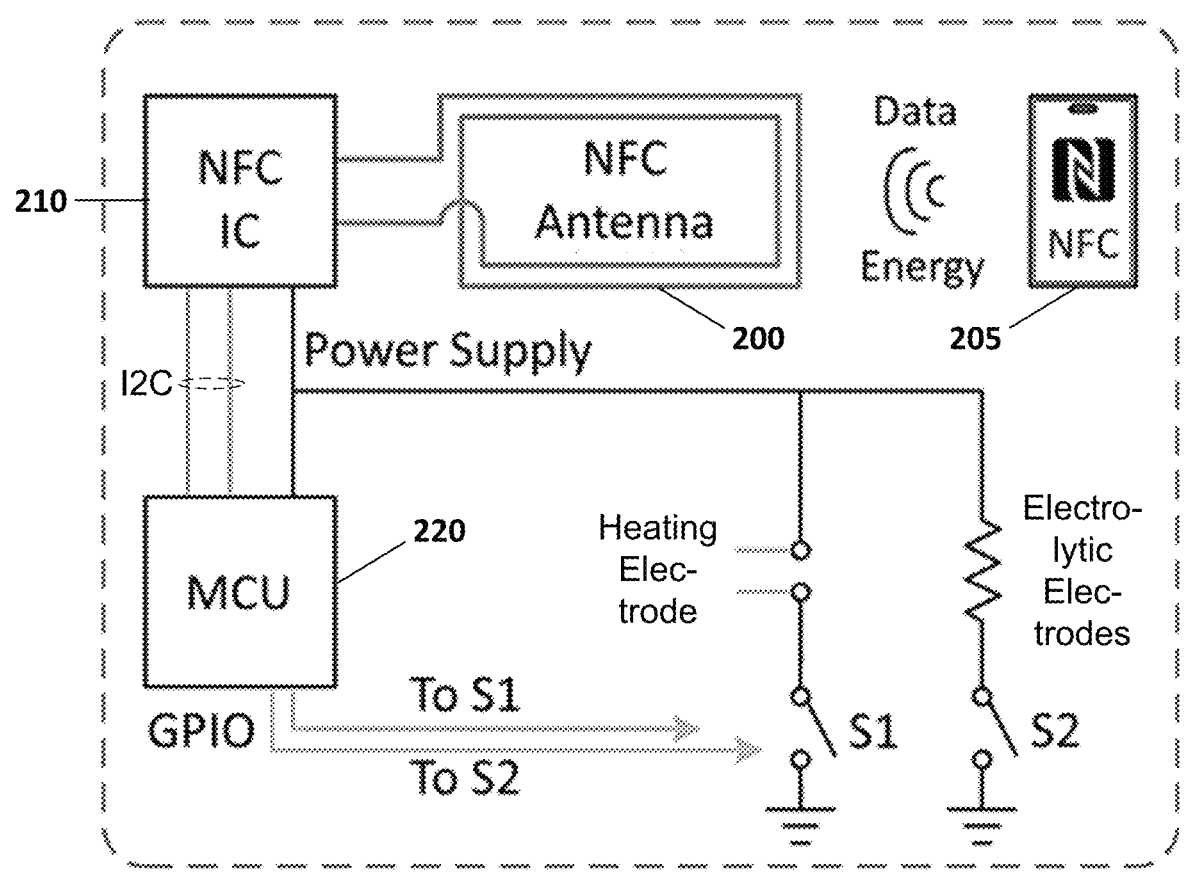
FIG. 4 is the schematic diagram of an exemplary control circuit module for the invention.

FIG. 4 is a schematic diagram of an exemplary control circuit, which may be on the drug reservoir lid of the pump. The NFC coil (which functions as an antenna for the wireless NFC signal transmission) 200 is configured to receive wireless signals from a smartphone 205 or other device capable of wireless (e.g., NFC) signal transmission. In particular, NFC signals can convey both energy and information. The NFC chip 210 converts the NFC signal to a data signal and transmits the data signal conveying the circuit selection (e.g., high-dose or basal rate) on an internal (e.g., I2C) bus to the MCU 220 for processing. The NFC chip 210 also generates a voltage output (which may be an analog output) via its integrated energy harvesting function to power itself, the MCU 220, and the basal rate circuit module and/or the high-dose circuit module (not shown). The MCU 220 selects the high-dose pump and/or the basal rate pump by transmitting a signal to the corresponding switch S1 and/or S2, respectively. When the switch S1/S2 is closed, a current passes through the corresponding electrode (s), thereby activating the corresponding pump. In one embodiment, the user can select both the basal rate option and the high-dose option.

The thermal expansion material in the high-dose pump/reservoir comprises poly(dimethyl siloxane) (PDMS) and expandable particles (e.g., thermally expandable microparticles), with the PDMS functioning as a binder and the particles serving as the thermally expandable material. The (micro) particles may have a core-shell structure, where the shell comprises a thermoplastic acrylic polymer and the core comprises spherical plastic particles containing a hydrocarbon gas. When heated to or beyond a predetermined temperature, the thermoplastic shell softens, enabling the gas in the core to expand. The thermal expansion material expands from the heat transferred to the thermal expansion material from the heating electrode, thus compressing the drug storage layer or material in the reservoir and expressing the drug into the injection conduit for release (e.g., into the user's body).

The heating electrode may comprise a metal (e.g., a 100 nm chromium layer and a 500 nm gold layer on a relatively rigid, inert substrate, such as a thread, ribbon or wire), which may be deposited onto the substrate by an electron beam evaporation coating process.

The electrolyte may comprise a dilute aqueous NaOH solution (e.g., having a concentration of 50 mM, but the invention is not limited to this value). When an appropriate voltage is placed across the electrolytic electrodes, this weak alkaline solution generates oxygen and hydrogen at the anode and cathode of the electrolytic electrodes, and the resulting gas pressure forces the propulsion piston (which preferably has the same area dimensions as the cavity in the basal rate reservoir) towards the bottom of the basal rate reservoir, compressing the drug-containing medium and facilitating the entry of the drug into the infusion pipeline for release. The anode of the electrolytic electrode may comprise gold or a gold coating on an electrically conductive material, while the cathode may comprise copper or a copper coating on an electrically conductive material. Gold exhibits excellent electrochemical stability and is relatively stable to oxidation. As the cathode, copper can effectively reduce hydrogen ions in water.

The invention further includes a method for manufacturing the ultra-miniaturized wireless-controlled patch-type drug pump. The method may comprise the following steps:

Step 1: Fabricate a base body (e.g., having predetermined dimensions) by 3D printing, along with two complementary half-cylindrical drug reservoirs and a circular cover or lid for the drug reservoir, utilizing an epoxy resin and/or adhesive. The drug reservoirs may have one or more dimensions matching corresponding dimension(s) of the base body, and the lid may have one or more dimensions matching corresponding dimension(s) of the drug reservoir(s). Furthermore, two magnets may be securely embedded into designated slots or openings in the drug reservoir cover using an epoxy adhesive. Specifically, a central line bisecting the drug reservoir cover may include a groove that aligns with the positions of both drug reservoirs. Each reservoir may have an aperture at its base, while the base body contains two apertures that correspond to the aperture in each respective reservoir. An upwardly extending cylinder or other structure around the aperture (e.g., through-hole) in the base may have dimensions fitting into the bottom aperture in each drug reservoir. Additionally, the drug reservoir cover may be pre-drilled with holes (e.g., on each side of the groove).

Step 2: Insert one end of a polyimide tube into each through-hole in the base body secure it to the base body by applying an epoxy adhesive to the interface between the polyimide tube and the base body. The polyimide tubes serve as the infusion conduits. Place a needle tip on the exterior of each polyimide tube to function as an infusion needle. Encapsulate the outermost (e.g., bottom) surface of the base body with PDMS, thereby creating a contact interface on the base body.

Step 3: Insert a medium for holding the drug solution and a semi-circular plunger into respective half-cylinder drug reservoirs in sequence, and introduce a specified volume of the drug solution through the perforated hole at the bottom of each reservoir (e.g., using a syringe or automated liquid dispensing apparatus). Adjust the position of the plunger to ensure that the level of the drug solution is flush with the hole, and seal the outlet with aluminum foil (and, optionally, an adhesive between the aluminum foil and the reservoir). This results in complementary semi-circular drug reservoirs.

Step 4: Incorporate a predetermined volume of expandable particles into a mixture of polydimethylsiloxane (PMDS) and a curing agent, and homogenize (e.g., mix) thoroughly. Subsequently, transfer the particle-infused PMDS mixture to the top of propulsion plunger in a subset of the drug reservoirs to create a thermally driven fluid pump. Finally, seal the top of the particle-infused PMDS mixture-containing drug reservoirs with aluminum foil to establish a large-dose delivery pump.

Step 5: Introduce medium for holding the electrolyte to the top of the plunger in a second subset of reservoirs (e.g., the remaining reservoirs) and add the electrolyte thereto to create a pneumatic fluid pump. Seal the upper section of the reservoir with a polyethylene-laminated film or paper to establish a basal rate reservoir.

Step 6: Form an NFC coil (and optionally, a plurality of electrical traces) on the upper/outer surface of the drug reservoir lid by electron beam evaporation or printing, and similarly deposit a thin conductive film onto both surfaces of the drug reservoir lid around each of a plurality of pre-drilled holes in the lid by electron beam evaporation or printing. Secure the heating electrode to the conductive film around one such pre-drilled hole and the electrolytic electrode to the conductive film around another such pre-drilled hole using an epoxy adhesive.

Step 7: Secure the circuit board containing the control circuitry to the upper/outer surface of the drug reservoir lid, establishing connections to the heating electrode, electrolytic electrode, and NFC coil through the pre-drilled holes and optional traces. Subsequently, encapsulate the upper surface of the drug reservoir lid with PDMS.

Step 8: Secure the two drug reservoirs to the base, position the drug reservoir lid atop the drug reservoirs, and insert the magnetic snap closure into its corresponding groove in/on the reservoir(s) to finalize the assembly of the detachable ultra-miniaturized wireless-controlled patch-type insulin pump.

In one embodiment, the temperature variation of the heating electrode was examined using an infrared thermal imager, and the volume alteration of the fluid pump in the transparent drug reservoir was recorded by monitoring the position of the propulsion piston to reflect the amount of liquid infused. The results are presented in FIG. 5.

Figure 5A:
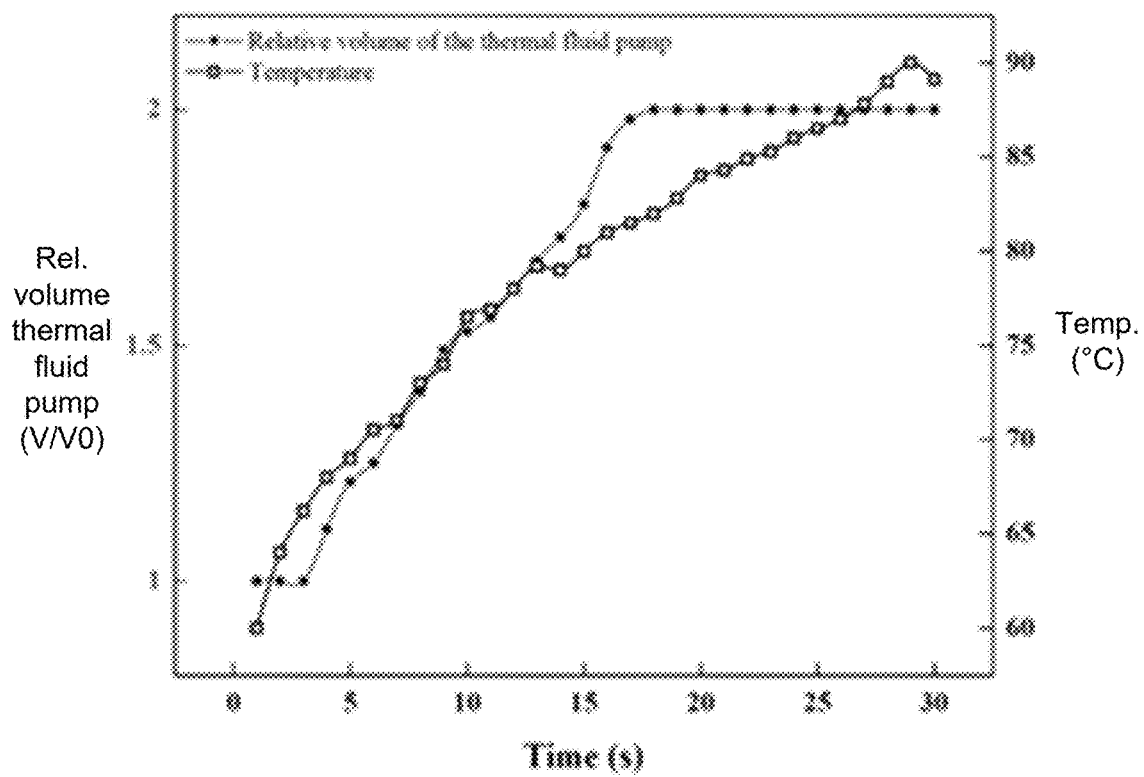
FIGS. 5A-B are graphs showing the results of exemplary fluid pumps in operation, where

For the high-dose drug reservoir, FIG. 5A depicts the temperature and volume changes of the heat-driven fluid pump of the heating module over time. The results indicate that the temperature of the heating electrode rapidly rose from approximately 60° C. to nearly 90° C. within 30 seconds after initiation of the heating module operation, which led to a rapid increase in the volume of the thermal expansion material. The thermal expansion material doubled its volume at 17 seconds, at which point the piston in the high-dose drug reservoir fully compressed the drug-containing medium, and drug infusion was complete.

Figure 5B:
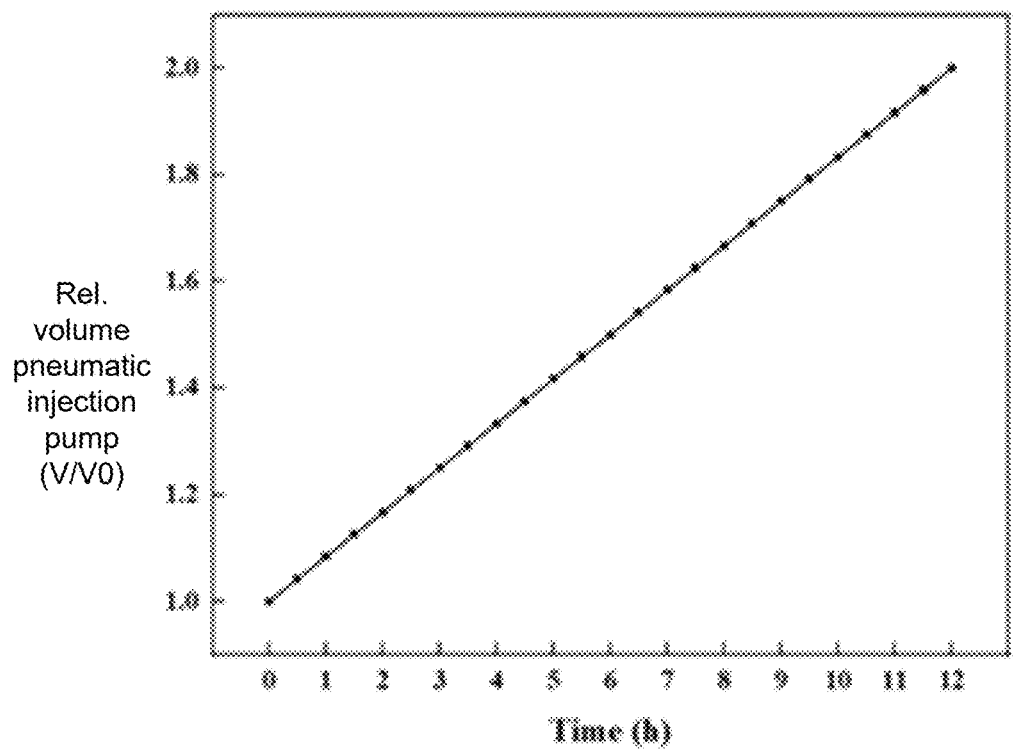

FIG. 5B shows the volume change of the pneumatic fluid pump over time. The results reveal that after 12 hours of operation, the electrolysis module electrolyzed water in the electrolyte to generate gas in a linear manner, and the propulsion piston in the basal rate drug reservoir was uniformly and linearly propelled to infuse the drug slowly. After 12 hours, the volume of the pneumatic fluid pump (i.e., the volume of the electrolyte, electrolyte medium, piston and generated gas) increased to twice its original size (the volume VO of the electrolyte, electrolyte medium and piston prior to electrolysis), and the basal rate drug reservoir was exhausted, completing one basal rate infusion cycle.

It is comprehensible that the invention is delineated through certain embodiments. It is well-known to those proficient in the art that various modifications or equivalent substitutions can be carried out on these features and embodiments without straying from the spirit and scope of the invention. Moreover, the features and embodiments of the invention can be adjusted by specific circumstances and materials under the guidance of the invention, without departing from its spirit and scope. Therefore, the invention is not constrained by the specific embodiments disclosed herein, and all embodiments falling within the scope of the claims of the application are encompassed within the purview of protection of the invention.

What is claimed:

1. An ultra-miniaturized wireless-controlled patch-type insulin pump comprising a circular drug reservoir lid, two complementary concave-shaped drug reservoirs, and a semi-implantable base, wherein:

the circular drug reservoir lid has a central axis with a groove that facilitates folding along the central axis; the circular drug reservoir lid has an upper surface that integrates a control circuit and an NFC coil; the circular drug reservoir lid includes a first half-circle cover and a second half-circle cover along the central axis, with the first half-circle cover having a lower surface incorporating a heating electrode, and the second half-circle having a lower surface incorporating an electrolytic electrode; the lower surfaces of the first half-circle cover and the second half-circle cover have an edge equipped with magnetic adhesive hooks; the control circuit, the NFC coil, the heating electrode, and the electrolytic electrode are electrically interconnected, and the control circuit governs operation of the heating electrode and the electrolytic electrode;

each of the concave-shaped drug reservoirs has an upper edge that contains a magnetic adhesive groove corresponding to the magnetic adhesive hooks on the circular drug reservoir lid; points where the concave-shaped drug reservoirs make contact align with grooves on said central axis; each of the concave-shaped drug reservoirs have a bottom with an aperture; one of the concave-shaped drug reservoirs is for high-dose execution and another one of the concave-shaped drug reservoirs is for basal rate execution; the high-dose execution reservoir includes a thermally driven fluid pump above insulin; the thermally driven fluid pump comprises an aluminum heat-conductive film encapsulation layer, a thermal expansion material, and an insulin propulsion piston; the aluminum heat-conductive thin film encapsulation layer contacts the heating electrode, allowing heat to be transferred to the thermal expansion material through the heating electrode, subsequently pushing up against the insulin propulsion piston, expelling insulin from the aperture in the bottom of the corresponding drug reservoir; the basal rate execution reservoir includes a pneumatic fluid pump above a corresponding insulin supply; the pneumatic fluid pump includes a polyethylene-coated paper electrolyte encapsulation layer, an electrolyte solution, and a basal rate insulin propulsion piston; the electrolytic electrode penetrates through the polyethylene-coated paper electrolyte encapsulation layer and contacts a base of said electrolyte solution to facilitate electrolysis that generates gas pressure, which propels forward in turn pushing down on basal rate insulin propulsion piston, thus enabling expulsion of insulin from the aperture in the bottom of the basal rate execution reservoir; and aluminum foil seals the apertures in the bottom of each of the high-dose drug reservoir and the basal rate execution reservoir;

the semi-implantable base comprises a base body, a contact base, and an infusion conduit; the base body and the contact base include at least two apertures that align with the apertures at the bottom of each of the high-dose drug reservoir and the basal rate execution reservoir; each pair of apertures on the base corresponds to a single infusion conduit, thereby establishing an integrated infusion pathway among the apertures of the high-dose drug reservoir and the basal rate execution reservoir, the base body, the contact base, and the infusion conduit; and the apertures on the base body extend upward, and when installed onto the base, the apertures on the base body penetrate the aluminum foil to create a passageway.

2. The ultra-miniaturized wireless-controlled patch-type insulin pump of claim 1, wherein the control circuit includes a microcontroller unit (MCU) and an NFC chip; the NFC chip collects information and energy from the NFC coil, and outputs a simulated voltage to the MCU, which in turn independently governs the operation of either the heating electrode or the electrolytic electrode by a process comprising:

the NFC coil captures an NFC energy signal emitted by a smart terminal and transmits it to the NFC chip; the NFC chip relays the signal to the MCU for processing while generating a simulated voltage output through an integrated energy harvesting functionality, thereby supplying power to the control circuit.

3. The ultra-miniaturized wireless-controlled patch-type insulin pump of claim 1, wherein each of the high-dose drug reservoir and the basal rate execution reservoir comprise a removable half-cylindrical concave drug reservoir.

4. The ultra-miniaturized wireless-controlled patch-type insulin pump of claim 1, wherein the high-dose drug reservoir and the basal rate execution reservoir have a maximum drug capacity of 0.5 ml, which can accommodate up to 50 units of U-100 insulin.

* * * * *